(12) United States Patent
Zheng et al.

(10) Patent No.: US 10,608,691 B1
(45) Date of Patent: Mar. 31, 2020

(54) COMPACT MULTIPLE-INPUT MULTIPLE-OUTPUT (MIMO) ANTENNA MODULE

(71) Applicant: Google LLC, Mountain View, CA (US)

(72) Inventors: Ming Zheng, Santa Clara, CA (US); Haijiang Ma, Campbell, CA (US); Michael Scott Southard, Jr., Morgan Hill, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/254,134

(22) Filed: Jan. 22, 2019

(51) Int. Cl.
*H04B 1/44* (2006.01)
*H04B 7/0413* (2017.01)
*H04B 1/00* (2006.01)
*H04W 88/06* (2009.01)

(52) U.S. Cl.
CPC ............ *H04B 1/44* (2013.01); *H04B 1/0057* (2013.01); *H04B 1/0064* (2013.01); *H04B 7/0413* (2013.01); *H04W 88/06* (2013.01)

(58) Field of Classification Search
CPC ...... H04B 1/44; H04B 1/0057; H04B 1/0064; H04B 7/0413
See application file for complete search history.

(56) References Cited

U.S. PATENT DOCUMENTS

| | | | |
|---|---|---|---|
| 6,496,150 B1 | 12/2002 | Li et al. | |
| 9,020,447 B2 * | 4/2015 | Bengtsson | H04B 17/00 455/78 |
| 9,077,085 B2 * | 7/2015 | Wong | H01Q 21/28 |
| 2003/0001784 A1 * | 1/2003 | Li | H01Q 1/521 343/702 |
| 2011/0128206 A1 * | 6/2011 | Wakabayashi | H01O 7/005 343/860 |
| 2011/0188552 A1 * | 8/2011 | Yoon | H04B 1/38 375/219 |
| 2013/0154890 A1 * | 6/2013 | Jan | H01Q 1/521 343/770 |
| 2013/0335286 A1 * | 12/2013 | Chen | H01Q 1/521 343/841 |

FOREIGN PATENT DOCUMENTS

WO   2018089947   5/2018

* cited by examiner

*Primary Examiner* — David Bilodeau
(74) *Attorney, Agent, or Firm* — Colby Nipper

(57) ABSTRACT

Techniques and apparatuses are described that implement a compact multiple-input multiple-output (MIMO) antenna module with two monopole antennas and a decoupling circuit. Due to a physical proximity of the two monopole antennas within the compact MIMO antenna module, the two monopole antennas indirectly couple to each other through one or more coupling paths. The decoupling circuit attenuates the resulting interference by providing a direct coupling path between the two monopole antennas. In this way, the decoupling circuit effectively counteracts the indirect coupling between the two monopole antennas to enable the two monopole antennas to behave substantially independent of each other for MIMO applications. The compact MIMO antenna module can be implemented within space-constrained devices and realize improved performance relative to other antenna modules that have a similar antenna spacing and do not include the decoupling circuit.

20 Claims, 7 Drawing Sheets

COMPACT MULTIPLE-INPUT MULTIPLE-OUTPUT (MIMO) ANTENNA MODULE

BACKGROUND

Antennas transmit and receive radio-frequency (RF) signals to communicate information. These radio-frequency signals enable users to talk with friends, download or upload information, share pictures, remotely control household devices, and receive global positioning information. Sometimes an electronic device includes multiple antennas that utilize multiple-input multiple-output (MIMO) techniques, such as spatial diversity or spatial multiplexing, to improve wireless communication performance. To implement spatial diversity, the multiple antennas transmit or receive redundant streams of information in parallel along different spatial paths associated with each of the antennas. This increases a reliability associated with transferring information between devices and further increases an effective wireless communication range. To implement spatial multiplexing, the multiple antennas transmit or receive different streams of information in parallel along the different spatial paths. This results in increased throughput for wireless communications.

Implementing multiple antennas that support MIMO techniques within the electronic device, however, can be challenging. Spatial constraints of the electronic device can, for example, limit physical distances between the multiple antennas. Without sufficient antenna spacing, the multiple antennas couple together and interfere with each other. The resulting interference can cause operational performance of the individual antennas to be dependent upon each other, which is undesirable for implementing MIMO techniques. Consequently, it may be impractical for some electronic devices that place a premium on small size to have sufficient space to achieve a target amount of isolation between the multiple antennas for MIMO applications.

SUMMARY

Techniques and apparatuses are described that implement a compact multiple-input multiple-output (MIMO) antenna module. The compact MIMO antenna module includes two monopole antennas and a decoupling circuit. Due to a physical proximity of the two monopole antennas within the compact MIMO antenna module, the two monopole antennas indirectly couple to each other through one or more coupling paths. The decoupling circuit, however, attenuates the resulting interference by providing a direct coupling path between the two monopole antennas. In this way, the decoupling circuit effectively counteracts the indirect coupling between the two monopole antennas and achieves a target isolation performance between the two monopole antennas. This enables the two monopole antennas to behave substantially independent of each other for MIMO applications. In this way, the compact MIMO antenna module can realize similar performance to another larger antenna module that includes larger antenna spacings between the monopole antennas. The compact MIMO antenna module can therefore be implemented within space-constrained devices and support MIMO applications.

Aspects described below include an antenna module comprising a first portion, a second portion, and a third portion with the second portion positioned between the first portion and the third portion. The antenna module also includes a first feed port, a second feed port, a first monopole antenna, a second monopole antenna, and a decoupling circuit. The first monopole antenna includes a first feed node coupled to the first feed port and a first decoupling node. At least a portion of the first monopole antenna is disposed within the first portion. The second monopole antenna includes a second feed node coupled to the second feed port and a second decoupling node. At least a portion of the second monopole antenna is disposed within the third portion. The decoupling circuit is coupled between the first decoupling node and the second decoupling node, and is disposed within the second portion. The decoupling circuit is configured to substantially isolate the first monopole antenna and the second monopole antenna from each other.

Aspects described below also include a method of operation for a compact multiple-input multiple-output antenna module. The method includes exciting a first monopole antenna of an antenna module with a first radio-frequency signal. The exciting of the first monopole antenna causes the first monopole antenna and the second monopole antenna to indirectly couple together via a first coupling path. The method also includes propagating, via the first coupling path, a portion of the first radio-frequency signal from the first monopole antenna to the second monopole antenna. The method further includes providing, via a decoupling circuit of the antenna module, a second coupling path that directly couples the first monopole antenna and the second monopole together. The first monopole antenna, the decoupling circuit, and the second monopole antenna are arranged such that the decoupling circuit is disposed within a portion of the antenna module that is between the first monopole antenna and the second monopole antenna. To generate a first cancellation signal, the method includes adjusting, via the decoupling circuit, characteristics of another portion of the first radio-frequency signal that propagates through the second coupling path. The method also includes attenuating the portion of the first radio-frequency signal at the second monopole antenna by providing the first cancellation signal to the second monopole antenna.

Aspects described below also include an apparatus comprising an antenna module with two monopole antennas and a decoupling circuit. The two monopole antennas include respective feed portions with respective feed nodes, and include respective open portions with respective decoupling nodes. The two monopole antennas are oriented such that the respective open portions are oriented towards each other and the respective feed portions are oriented away from each other. The decoupling circuit is coupled between the respective decoupling nodes of the two monopole antennas and is configured to substantially isolate the two monopole antennas from each other.

Aspects described below also include a system with decoupling means for isolating two monopole antennas that are indirectly coupled together due to physical proximity.

BRIEF DESCRIPTION OF THE DRAWINGS

Apparatuses for and techniques implementing a compact multiple-input multiple-output (MIMO) antenna module are described with reference to the following drawings. The same numbers are used throughout the drawings to reference like features and components.

DETAILED DESCRIPTION

Overview

Implementing multiple antennas that support MIMO techniques within the electronic device can be challenging. Spatial constraints of the electronic device can, for example, limit physical distances between the multiple antennas. Without sufficient antenna spacings, the multiple antennas couple together and interfere with each other. The resulting interference can cause operational performance of the individual antennas to be dependent upon each other, which degrades performance for MIMO applications. Consequently, it may be impractical for some electronic devices that place a premium on small size to have sufficient space to achieve a target amount of isolation between the multiple antennas for MIMO applications.

To address this issue, techniques and apparatuses are described that implement a compact MIMO antenna module. The compact MIMO antenna module includes two monopole antennas and a decoupling circuit. Due to a physical proximity of the two monopole antennas within the compact MIMO antenna module, the two monopole antennas indirectly couple to each other through one or more coupling paths. The decoupling circuit, however, attenuates the resulting interference by providing a direct coupling path between the two monopole antennas. In this way, the decoupling circuit effectively counteracts the indirect coupling between the two monopole antennas and achieves a target isolation performance between the two monopole antennas. This enables the two monopole antennas to behave substantially independent of each other for MIMO applications. In this way, the compact MIMO antenna module can realize similar performance to another larger antenna module that includes larger antenna spacings between the monopole antennas. The compact MIMO antenna module can therefore be implemented within space-constrained devices and support MIMO applications.

Example Environment

Figure 1:
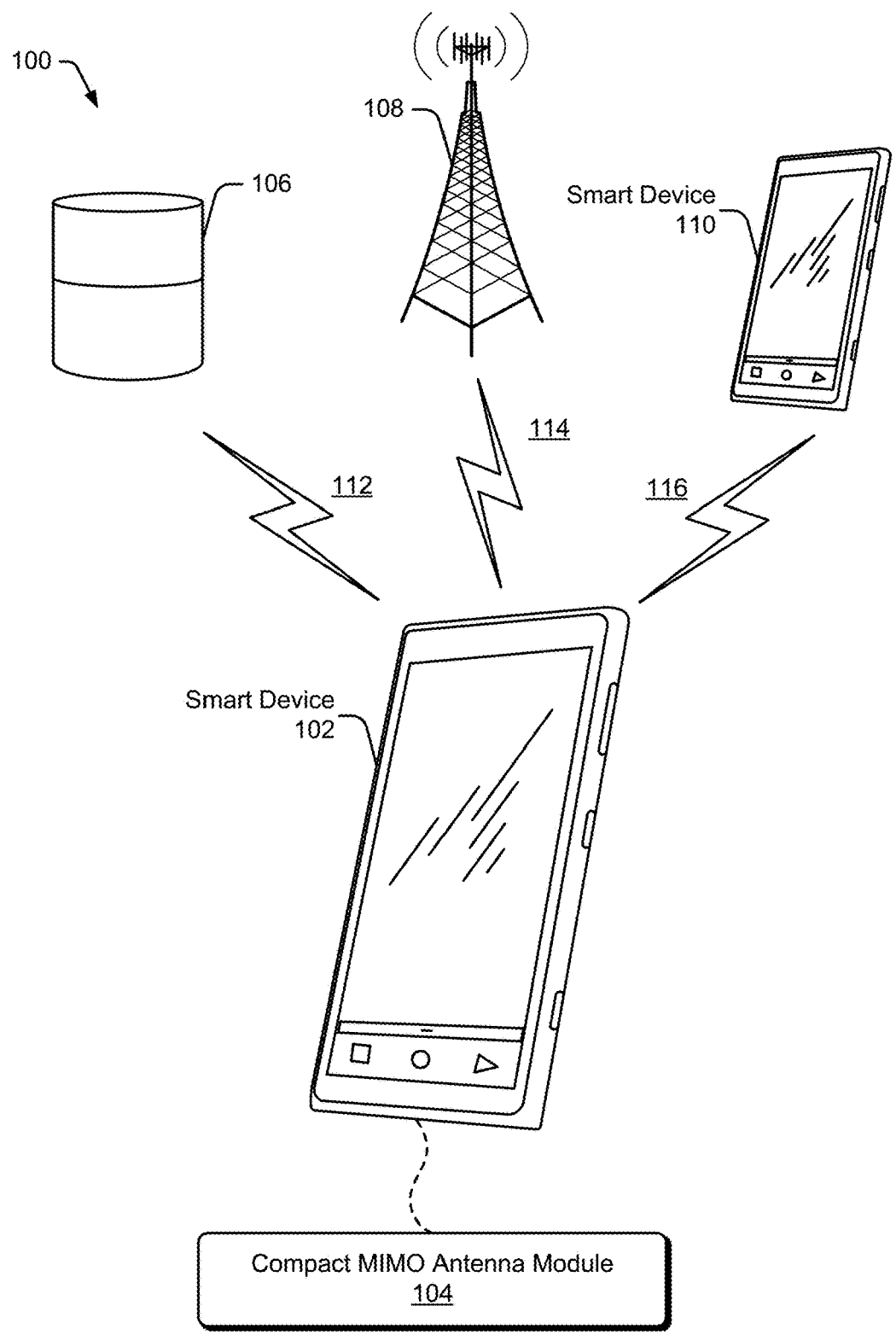
FIG. 1 illustrates example environments in which a compact MIMO antenna module can be implemented.

FIG. 1 is an illustration of an example environment in which techniques using, and an apparatus including, a compact MIMO antenna module may be embodied. In the depicted environment 100, a smart device 102 includes a compact MIMO antenna module 104. The compact MIMO antenna module 104 enables multiple antennas to fit within size constraints of the smart device 102. Although the smart device 102 is shown to be a smart phone in FIG. 1, the smart device 102 can alternatively be implemented as any suitable computing or electronic device, as further described with respect to FIG. 2.

In the environment 100, the smart device 102 is a user equipment (UE) that communicates with a wireless local area network (WLAN) router 106, a base station 108, or another smart device 110 via respective wireless links 112, 114, and 116. Any suitable communication protocols or standards can be used to implement the wireless links 112, 114, and 116. For example, the wireless link 112 represents a Wi-Fi™ link, the wireless link 114 represents a Third Generation Partnership Project Long-Term Evolution (3GPP LTE) link or a Fifth-Generation New Radio (5G NR) link, and the wireless link 116 represents a Bluetooth™ link.

Figure 2:
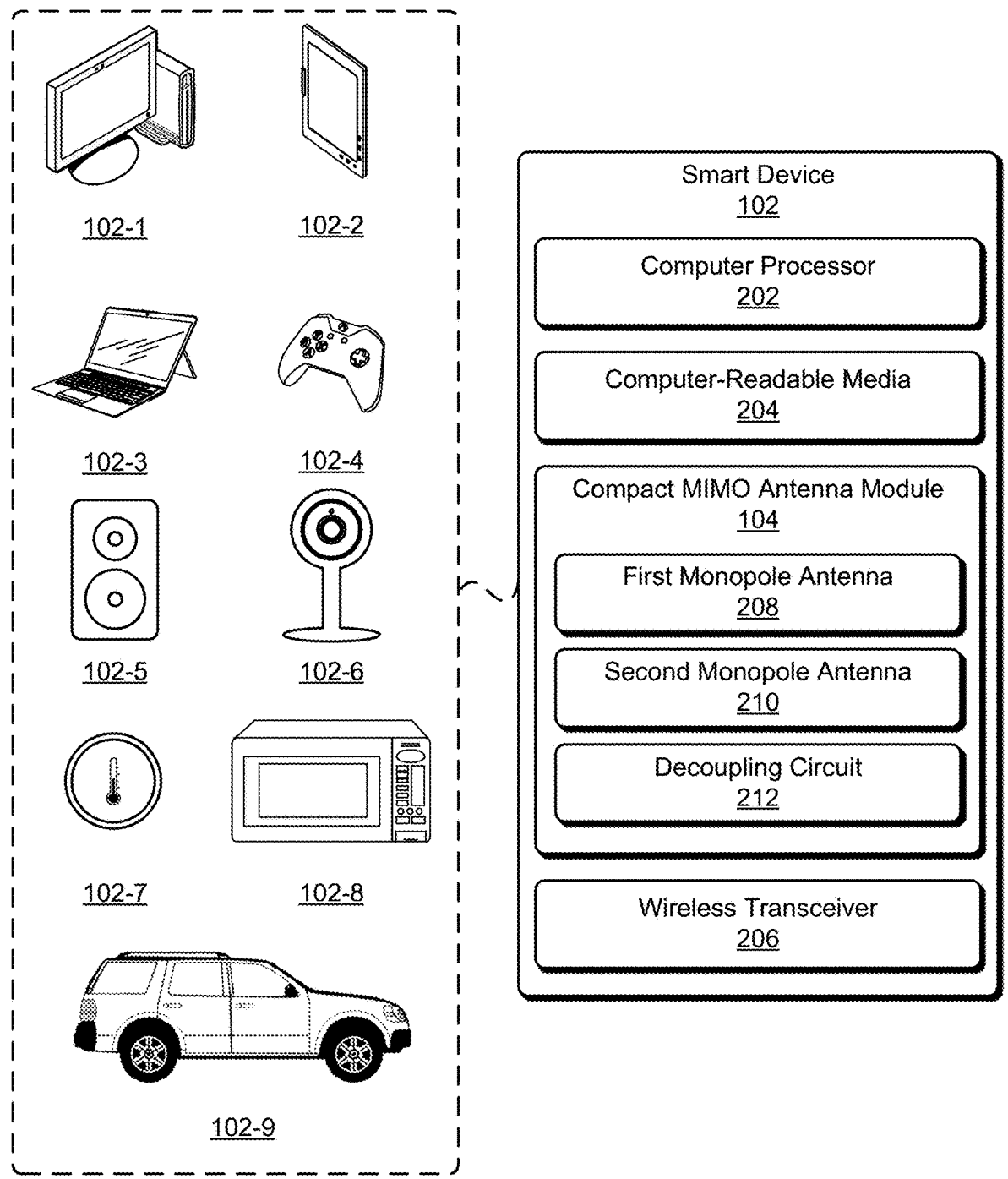
FIG. 2 illustrates an example compact MIMO antenna module as part of a smart device.

FIG. 2 illustrates the compact MIMO antenna module 104 as part of the smart device 102. The smart device 102 can be any suitable computing device or electronic device, such as a desktop computer 102-1, a tablet 102-2, a laptop 102-3, a gaming system 102-4, a smart speaker 102-5, a security camera 102-6, a smart thermostat 102-7, a microwave 102-8, and a vehicle 102-9. Other devices may also be used, such as home-service devices, radar systems, baby monitors, routers, computing watches, computing glasses, televisions, drones, charging devices, Internet of Things (IoT) devices, Advanced Driver Assistance Systems (ADAS), point-of-sale (POS) transaction systems, health monitoring devices, track pads, drawing pads, netbooks, e-readers, home-automation and control systems, and other home appliances. The smart device 102 can be wearable, non-wearable but mobile, or relatively immobile (e.g., desktops and appliances).

The smart device 102 includes one or more computer processors 202 and computer-readable media 204, which includes memory media and storage media. Applications and/or an operating system (not shown) embodied as computer-readable instructions on the computer-readable media 204 can be executed by the computer processor 202. The computer-readable instructions can store instructions to enable wireless communications with the WLAN router 106, the base station 108, or the smart device 110 of FIG. 1. The smart device 102 may also include a display (not shown).

The smart device 102 includes at least one compact MIMO antenna module 104 and at least one wireless transceiver 206 to transmit and receive radio-frequency signals. The compact MIMO antenna module 104 is a MIMO antenna that includes at least two antennas and at least one decoupling circuit. In the depicted configuration, the compact MIMO antenna module 104 includes a first monopole antenna 208, a second monopole antenna 210, and a decoupling circuit 212.

The first monopole antenna 208 and the second monopole antenna 210 can be printed circuit board (PCB) antennas. A variety of different types of monopole antennas can be implemented, including inverted-F antennas (IFAs) or inverted-L antennas. In some cases, the first monopole antenna 208 and the second monopole antenna 210 can resonate at multiple frequencies, such as at approximately 2.4 gigahertz (GHz) and 5 GHz. Generally, the first monopole antenna 208 and the second monopole antenna 210 are arranged in close proximity to one another within the compact MIMO antenna module 104. Due to this proximity, the first monopole antenna 208 and the second monopole antenna 210 indirectly couple together and interfere with each other.

The decoupling circuit 212 is physically located between the first monopole antenna 208 and the second monopole antenna 210. In some implementations, the decoupling circuit 212 includes one or more passive components, such as an inductor, a capacitor, or a combination thereof. In other implementations, the decoupling circuit 212 includes one or more active components, such as a varactor, a diode, a switch, or a transistor. The decoupling circuit 212 can be implemented with distributed elements or lumped elements. The use of lumped elements enables an overall size of the decoupling circuit 212 to be reduced relative to another decoupling circuit that uses distributed elements. Generally, the decoupling circuit 212 improves isolation between the first monopole antenna 208 and the second monopole antenna 210 relative to another MIMO antenna or antenna module that has a similar antenna spacing and does not include the decoupling circuit 212. In some cases, the isolation improvement can be between approximately 10 decibels (dB) and 20 dB.

By improving the isolation between the first monopole antenna 208 and the second monopole antenna 210, the first monopole antenna 208 and the second monopole antenna 210 behave independently from each other, which improves performance for MIMO applications. In particular, the first monopole antenna 208 and the second monopole antenna 210 can realize different radiation patterns with different quantities of main lobes or different directions of the main lobes. With different radiation patterns, the first monopole antenna 208 and the second monopole antenna 210 can transmit or receive signals over different spatial paths.

The wireless transceiver 206 includes circuitry and logic for generating and processing radio-frequency signals. Components of the wireless transceiver 206 can include amplifiers, mixers, switches, analog-to-digital converters, filters, and so forth for conditioning the radio-frequency signals. The wireless transceiver 206 also includes logic to perform in-phase/quadrature (I/Q) operations, such as modulation or demodulation. Together the wireless transceiver 206 and the compact MIMO antenna module 104 can transmit or receive signals with frequencies in sub-GHZ bands, sub-6 GHz bands, and/or above 6 GHz bands that are defined by the one or more supported communication standards. Operations of the compact MIMO antenna module 104 and the wireless transceiver 206 are further described with respect to FIG. 3.

Compact MIMO Antenna Module

Figure 3:
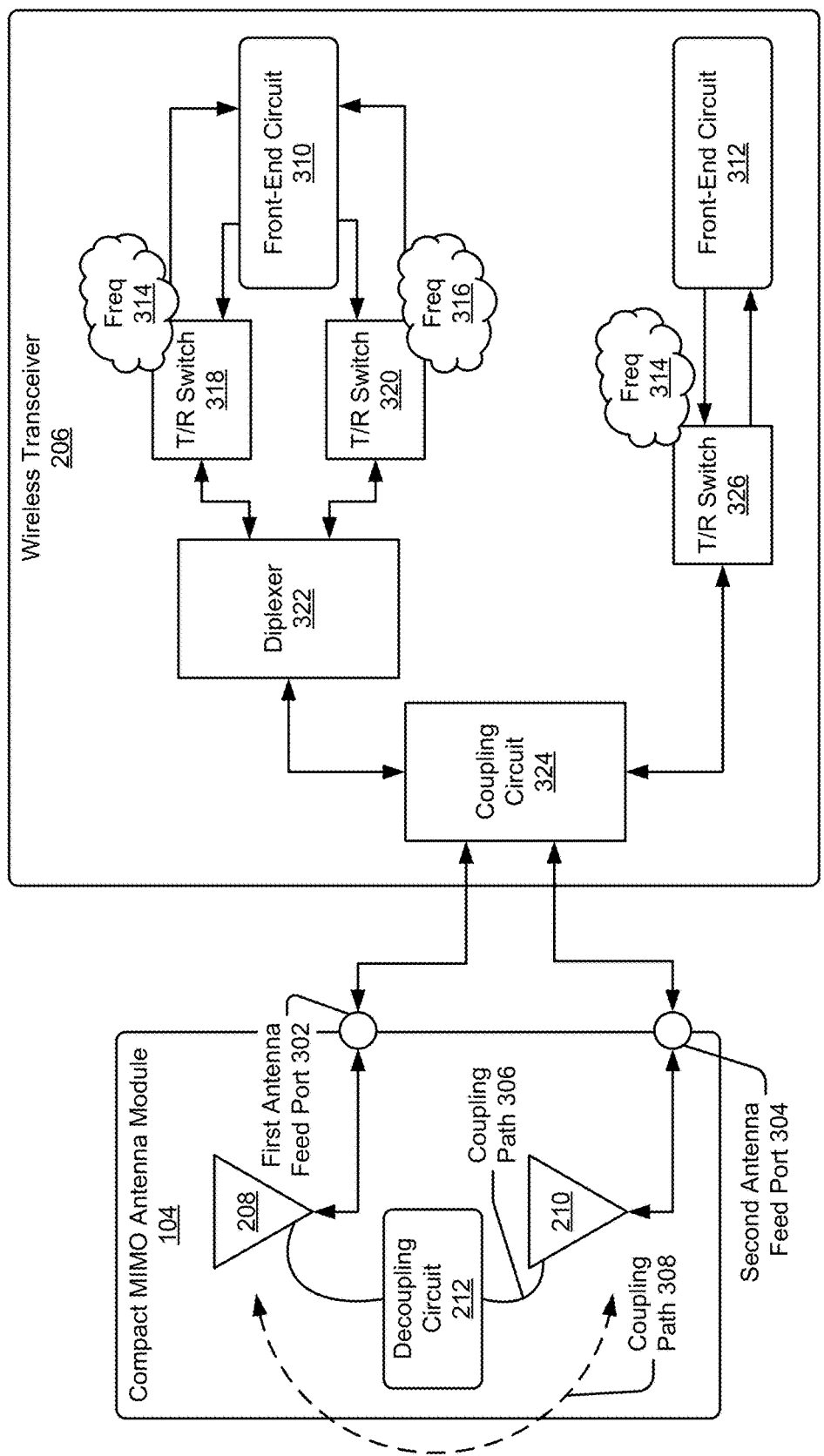
FIG. 3 illustrates an example compact MIMO antenna module and an example wireless transceiver.

FIG. 3 illustrates an example compact MIMO antenna module 104 and an example wireless transceiver 206. In the depicted configuration, the compact MIMO antenna module 104 includes a first antenna feed port 302 and a second antenna feed port 304, which are respectively coupled to the first monopole antenna 208 and the second monopole antenna 210. The decoupling circuit 212 provides a direct coupling path 306 between the first monopole antenna 208 and the second monopole antenna 210. Due to a proximity of the first monopole antenna 208 and the second monopole antenna 210, another coupling path 308 also exists between the first monopole antenna 208 and the second monopole antenna 210 that indirectly couples the first monopole antenna 208 and the second monopole antenna 210 together. This other coupling path 308 can include a coupling path over the air (OTA) or a path over ground.

The wireless transceiver 206 includes two front-end circuits 310 and 312, which are associated with different types of wireless communication links. For example, the front-end circuit 310 comprises a Wi-Fi™ front-end circuit that generates or processes Wi-Fi™ signals associated with the wireless link 112. Likewise, the front-end circuit 312 comprises a Bluetooth™ front-end circuit that generates or processes Bluetooth™ signals associated with the wireless link 116 of FIG. 1.

One or more of the front-end circuits can utilize multiple carrier frequencies. In this case, the front-end circuit 310 generates or processes signals associated with a first carrier frequency 314 and a second carrier frequency 316. The front-end circuit 312 also generates or processes signals associated with the first carrier frequency 314. Continuing with the above example, the first carrier frequency 314 is approximately 2.4 GHz and the second carrier frequency 316 is approximately 5 GHz, for instance.

To support the multiple carrier frequencies 314 and 316, the front-end circuit 310 is coupled to two transmit and receive (T/R) switches 318 and 320. The T/R switches 318 and 320 are further coupled to a diplexer 322, which passes signals associated with the different carrier frequencies 314 and 316 between a coupling circuit 324 and the corresponding T/R switches 318 and 320. The two T/R switches 318 and 320 further pass signals between the diplexer 322 and transmitter portions and receiver portions of the front-end circuit 310 that correspond to the different carrier frequencies 314 and 316. Similar to the front-end circuit 310, the front-end circuit 312 is coupled to a T/R switch 326. Because the front-end circuit 312 supports one carrier frequency (e.g., the carrier frequency 314), a path between the coupling circuit 324 and the front-end circuit 312 does not require additional T/R switches or a diplexer, as shown above with respect to the front-end circuit 310.

The coupling circuit 324 couples at least one front-end circuit of the wireless transceiver 206 to the compact MIMO antenna module 104. As an example, the coupling circuit 324 passes individual signals between the first monopole antenna 208 and a selected one of the front-end circuits 310 or 312, and between the second monopole antenna 210 and the selected front-end circuit 310 or 312. In this manner, the coupling circuit 324 enables different wireless communication signals to be provided to the first antenna feed port 302 or the second antenna feed port 304 using either the front-end circuit 310 or the front-end circuit 312. For MIMO applications, the individual signals can include redundant streams of information for implementing spatial diversity techniques or different streams of information for implementing spatial multiplexing techniques. In some implementations, the coupling circuit 324 includes a double-pole double-throw (DPDT) switch with one throw coupled to the diplexer 322, another throw coupled to the T/R switch 326, and two poles respectively coupled to the first antenna feed port 302 and the second antenna feed port 304. The compact MIMO antenna module 104 is further described with respect to FIG. 4.

Figure 4:
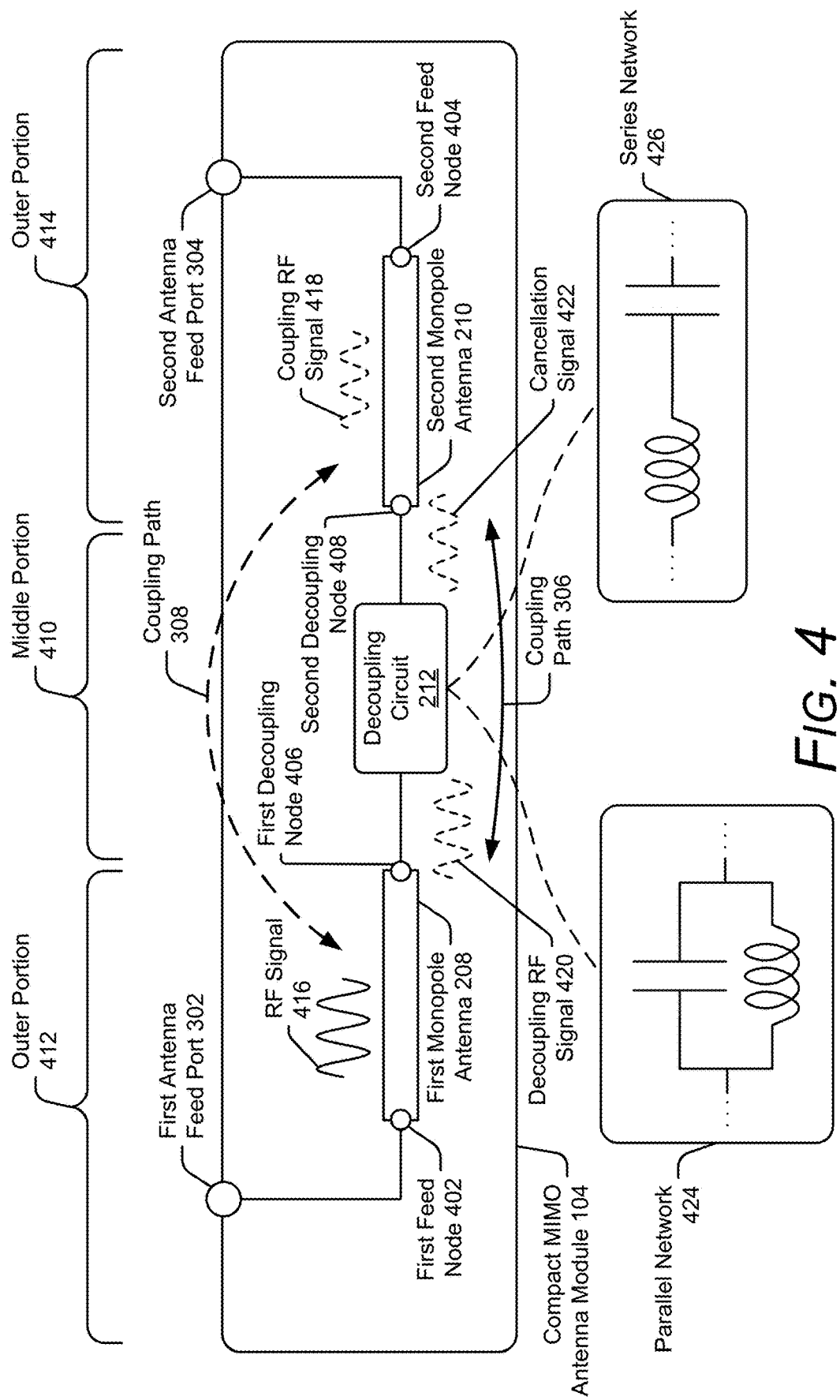
FIG. 4 illustrates an example schematic of a compact MIMO antenna module.

FIG. 4 illustrates an example schematic of the compact MIMO antenna module 104. In the depicted configuration, the first monopole antenna 208 includes a first feed node 402 and the second monopole antenna 210 includes a second feed node 404. The first feed node 402 is coupled to the first antenna feed port 302 and the second feed node 404 is coupled to the second antenna feed port 304. The first monopole antenna 208 and the second monopole antenna 210 also include a first decoupling node 406 and a second decoupling node 408, respectively.

Generally, the feed nodes 402 and 404 are on opposite sides of the monopole antennas 208 and 210 relative to the decoupling nodes 406 and 408. Furthermore, the first monopole antenna 208 and the second monopole antenna 210 are oriented and positioned such that the decoupling circuit 212 can be implemented within available space between the first decoupling node 406 and the second decoupling node 408. In this case, the decoupling circuit 212 is located within a middle portion 410 of the compact MIMO antenna module 104 while at least a portion of the first monopole antenna 208 and at least a portion of the second monopole antenna 210 are implemented within respective outer portions 412 and 414 of the compact MIMO antenna module 104. By disposing the decoupling circuit 212 within the middle portion 410, a size of the compact MIMO antenna module 104 can be further reduced relative to other designs that implement the decoupling circuit within outer portions of an antenna module or wrap portions of the decoupling circuit around the multiple antennas.

In some implementations, the decoupling circuit 212 is implemented as a parallel network 424, which includes at least one inductor and at least one capacitor that are coupled together in parallel between the first decoupling node 406 and the second decoupling node 408. In other implementations, a series network 426 implements the decoupling circuit 212 with at least one inductor and at least one capacitor coupled together in series between the first decoupling node 406 and the second decoupling node 408. Although not shown, other implementations of the decoupling circuit 212 can include active components. Using any of these implementations, the decoupling circuit 212 adjusts amplitudes and/or phases of signals that pass through the decoupling circuit 212 between the first decoupling node 406 and the second decoupling node 408. In particular, the decoupling circuit 212 can attenuate the signals using passive components or amplify the signals using active components. By adjusting characteristics of the signals, the decoupling circuit 212 can counteract the indirect coupling effects experienced by the first monopole antenna 208 and the second monopole antenna 210, as further described below.

In some cases, the decoupling circuit 212 dynamically adjusts characteristics of the signals to counteract variations in the coupling path 308 between the first monopole antenna 208 and the second monopole antenna 210. These variations can occur over time in response to environmental changes, such as a changing proximity of a user's appendage to the compact MIMO antenna module 104. Additionally or alternatively, these variations can occur in response to the use of different carrier frequencies. In this case, the decoupling circuit 212 can include one or more components with a variable capacitance, a variable inductance, or a variable resistance.

During operation, the first monopole antenna 208 transmits or receives a radio-frequency (RF) signal 416. Due to a proximity of the second monopole antenna 210, however, a first portion of the RF signal 416 appears at the second monopole antenna 210 as a coupling RF signal 418. Because the coupling RF signal 418 propagates through the coupling path 308, the coupling RF signal 418 can differ in amplitude or phase relative to the RF signal 416. A second portion of the RF signal 416 is also provided to the decoupling circuit 212 as a decoupling RF signal 420. The decoupling RF signal 420 propagates across the coupling path 306 and through the decoupling circuit 212. The decoupling circuit 212 adjusts the amplitude and/or phase of the decoupling RF signal 420 to generate a cancellation signal 422. Generally, the decoupling circuit 212 causes the cancellation signal 422 to have a relatively similar amplitude to the coupling RF signal 418 and have a relative phase that differs by approximately 180 degrees from the coupling RF signal 418. The cancellation signal 422 is provided to the second monopole antenna 210 via the second decoupling node 408. At the second monopole antenna 210, the cancellation signal 422 destructively combines with the coupling RF signal 418 and attenuates the coupling RF signal 418. By attenuating the coupling RF signal 418, the isolation between the first monopole antenna 208 and the second monopole antenna 210 improves.

Although not explicitly shown, similar operations occur as the second monopole antenna 210 transmits or receives another RF signal. Accordingly, the decoupling circuit 212 generates another cancellation signal that attenuates another coupling RF signal 418 at the first monopole antenna 208 based on another decoupling RF signal that is provided by the second monopole antenna 210.

Figure 5:
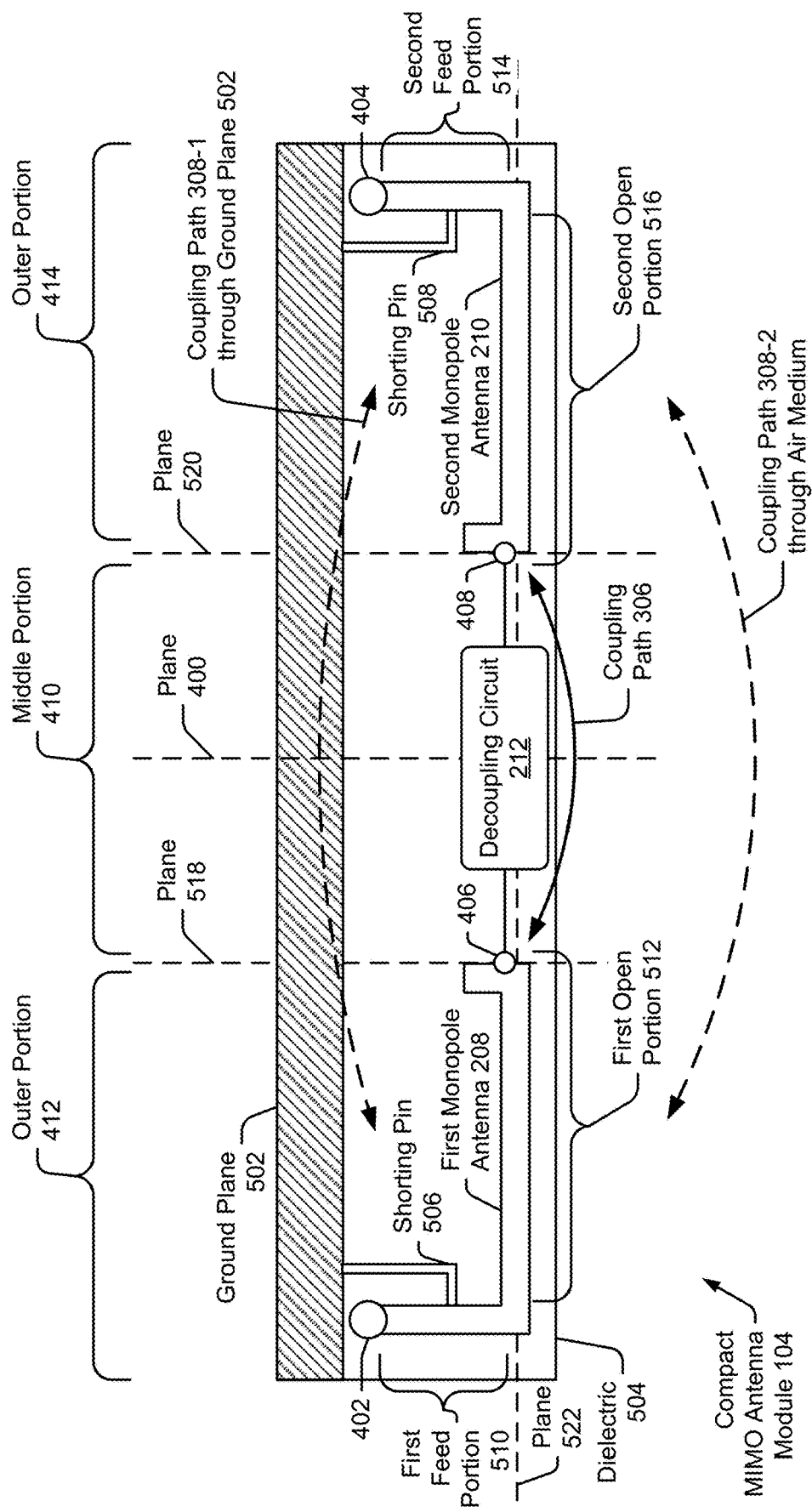
FIG. 5 illustrates example coupling paths within a compact MIMO antenna module using inverted-F antennas.

FIG. 5 illustrates example coupling paths within the compact MIMO antenna module 104. In the depicted configuration, the compact MIMO antenna module 104 includes a ground plane 502 and a dielectric 504. The first monopole antenna 208 and the second monopole antenna 210 are disposed within the dielectric 504, and are implemented as inverted-F antennas with respective shorting pins 506 and 508. In some cases, the first monopole antenna 208 and the second monopole antenna 210 are symmetrical about a plane 400 that is approximately perpendicular to the ground plane 502. The shorting pins 506 and 508 respectively couple the first monopole antenna 208 and the second monopole antenna 210 to the ground plane 502. The first monopole antenna 208 is shown to include a first feed portion 510 and a first open portion 512. The first feed portion 510 includes the first feed node 402 and the shorting pin 506. In contrast, the first open portion 512 includes the first decoupling node 406. The second monopole antenna 210 similarly includes a second feed portion 514 and a second open portion 516. Generally, the first node 402 and the second feed node 404 are closer to the respective shorting pins 506 and 508 than the decoupling nodes 406 and 408.

Due to orientations of the first monopole antenna 208 and the second monopole antenna 210, the respective open portions 512 and 516 of the first monopole antenna 208 and the second monopole antenna 210 are oriented towards each other while the respective feed portions 510 and 514 are oriented away from each other. As a result, the feed nodes 402 and 404 and the decoupling nodes 406 and 408 are arranged along a plane 522 that is approximately parallel to the ground plan 502 in order from left-to-right: the first feed node 402, the first decoupling node 406, the second decoupling node 408, and the second feed node 404. In other words, a distance between the first decoupling node 406 and the second decoupling node 408 is shorter than a distance between the first feed node 402 and the second feed node 404. Consequently, the first decoupling node 406 and the second decoupling node 408 are physically located within or proximate to the middle portion 410 of the compact MIMO antenna module 104.

In this example, the middle portion 410 represents a volume defined by dimensions of the dielectric 504 and by planes 518 and 520, which are approximately perpendicular to the ground plane 502 and respectively pass through the first decoupling node 406 and the second decoupling node 408. The decoupling circuit 212 is therefore physically located and constrained within this volume. A shape of the middle portion 410 can be a right-rectangular prism, however other irregular three-dimensional shapes are also possible. A distance between the planes 518 and 520 can be on the order of centimeters or less to enable the compact MIMO antenna module 104 to achieve a target size. Visually, a design of the compact MIMO antenna module 104 is similar to a single loop antenna with a middle section removed and replaced with the decoupling circuit 212. In contrast to the loop antenna, however, the first monopole antenna 208 and the second monopole antenna 210 operate independent of one another and have separate feed nodes 402 and 404.

In FIG. 5, the plane 400 passes through the decoupling circuit 212 and the plane 522 passes through the first open portion 512, the decoupling circuit 212, and the second open portion 516. In other implementations, the decoupling circuit 212 can be located at other vertical positions along the plane 400, which can result in the decoupling circuit 212 not being fully between the first monopole antenna 208 and the second monopole antennas 210, e.g., being on another plane that is parallel to the plane 522.

Generally, dimensions of the decoupling circuit 212 encompass open space that exists within the dielectric 504 between the first monopole antenna 208 and the second monopole antenna 210 (e.g., available space between the feed portions 510 and 514 and the open portions 512 and 516). In this way, portions of the decoupling circuit 212 fit within an antenna spacing of the first monopole antenna 208 and the second monopole antenna 210. A portion of the decoupling circuit 212 can exist, for example, along a plane that passes through both the first monopole antenna 208 and the second monopole antenna 210 (e.g., along the plane 522). In some implementations, a portion of the decoupling circuit 212 can exist along another plane that is parallel to the plane 522 but resides in a region not between the first monopole antenna 208 and the second monopole antenna 210.

During operation, the first monopole antenna 208 and the second monopole antenna 210 are indirectly coupled together through ground coupling and/or over-the-air coupling. For instance, a first coupling path 308-1 indirectly couples the first monopole antenna 208 and the second monopole antenna 210 together through at least a portion of the ground plane 502. A second coupling path 308-2 also indirectly couples the first monopole antenna 208 and the second monopole antenna 210 together through an air medium. Using the coupling path 306, the decoupling circuit 212 can compensate for both the first coupling path 308-1 and the second coupling path 308-2 to improve isolation between the first monopole antenna 208 and the second monopole antenna 210 for MIMO applications, as described above.

Example Method

Figure 6:
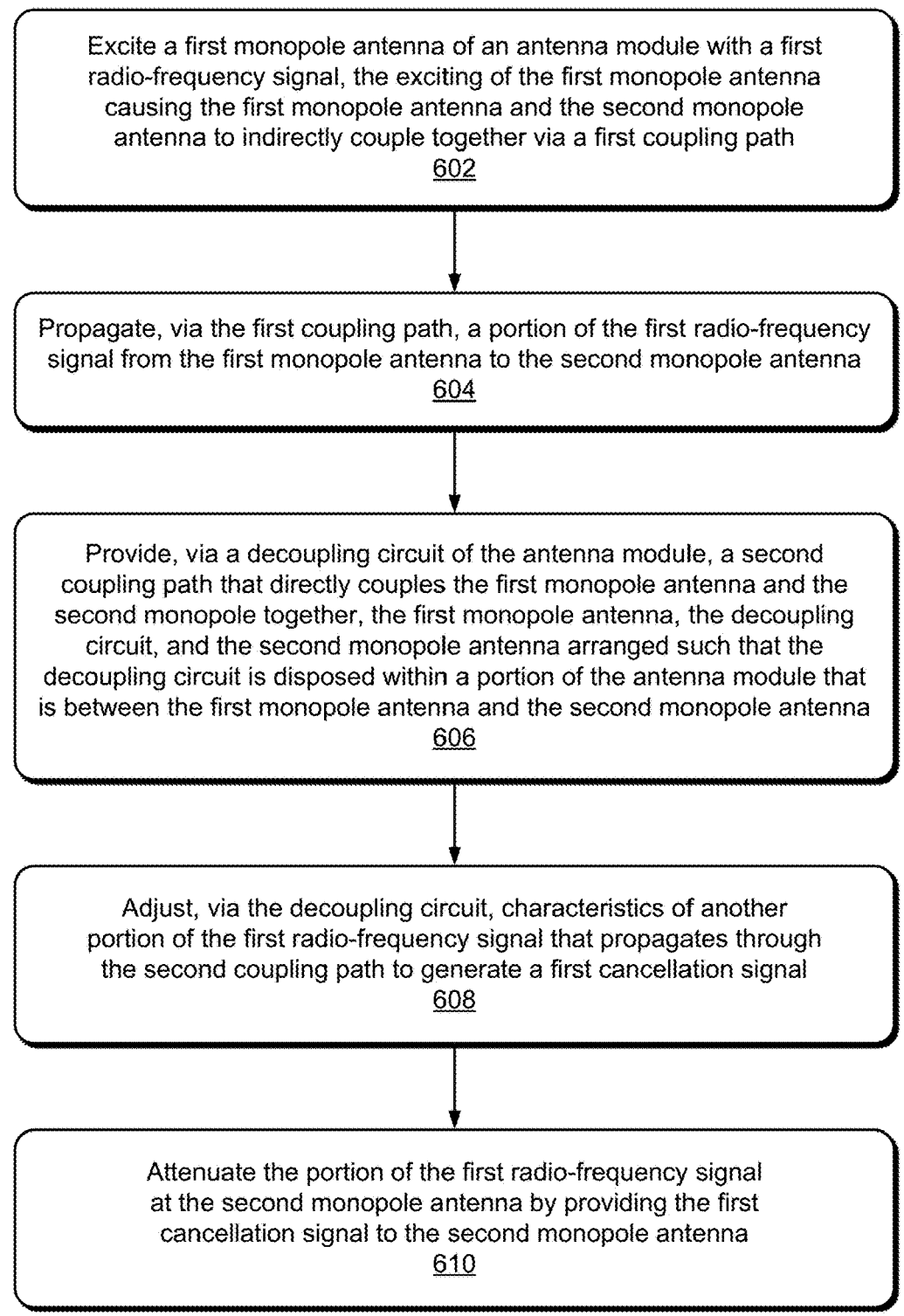
FIG. 6 illustrates an example method for performing operations of a compact MIMO antenna module.

FIG. 6 depicts an example method 600 for performing operations of a compact MIMO antenna module 104. Method 600 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environment 100 of FIG. 1, and entities detailed in FIG. 2, reference to which is made for example only. The techniques are not limited to performance by one entity or multiple entities operating on one device.

At 602, a first monopole antenna of an antenna module is excited with a first radio-frequency signal. The exciting of the first monopole antenna causes the first monopole antenna and the second monopole antenna to indirectly couple together via a first coupling path. For example, the wireless transceiver 206 provides the RF signal 416 for transmission via the first antenna feed port 302, which excites the first monopole antenna 208. Alternatively, the first monopole antenna 208 receives the RF signal 416 from another device, such as the WLAN router 106, the base station 108, or the smart device 110 of FIG. 1. The exciting of the first monopole antenna 208 causes the first monopole antenna 208 and the second monopole antenna 210 of the compact MIMO antenna module 104 to indirectly couple together via one or more coupling paths, such as through the coupling paths 308-1 and/or 308-2 of FIG. 5.

At 604, a portion of the first radio-frequency signal propagates from the first monopole antenna to the second monopole antenna via the first coupling path. For example, the one or more coupling paths 308 propagate a portion of the RF signal 416 from the first monopole antenna 208 to the second monopole antenna 210. The portion of the RF signal 416 that appears at the second monopole antenna 210 is represented as the coupling RF signal 418 in FIG. 4. In some cases, the coupling RF signal 418 can have a different amplitude or a different phase relative to the RF signal 416 due to characteristics of the coupling path 308.

At 606, a second coupling path that directly couples the first monopole antenna and the second monopole together is provided via a decoupling circuit of the antenna module. The first monopole antenna, the decoupling circuit, and the second monopole antenna are arranged such that the decoupling circuit is disposed within a portion of the antenna module that is between the first monopole antenna and the second monopole antenna. For example, the decoupling circuit 212 provides the coupling path 306 that directly couples the first monopole antenna 208 and the second monopole antenna 210 together. At least a portion of the first monopole antenna 208 is disposed in the outer portion 412 of the compact MIMO antenna module 104 and at least a portion of the second monopole antenna 210 is disposed in the outer portion 414 of the compact MIMO antenna module 104. The decoupling circuit 212 is disposed in the middle portion 410 of the compact MIMO antenna module 104 that is between the outer portions 412 and 414, as shown in FIGS. 4 and 5. With the decoupling circuit 212, the first monopole antenna 208 and the second monopole antenna 210 can be positioned proximate to each other to reduce an overall size of the compact MIMO antenna module 104 and achieve a target isolation performance for MIMO applications. By positioning the decoupling circuit 212 between the first monopole antenna 208 and the second monopole antenna 210, the overall size of the compact MIMO antenna module 104 can also be made small to fit within space-constrained devices.

At 608, characteristics of another portion of the first radio-frequency signal that propagates through the decoupling path is adjusted via the decoupling circuit to generate a first cancellation signal. For example, the decoupling circuit 212 adjusts an amplitude or a phase of a second portion of the first radio-frequency signal that is represented as the decoupling RF signal 420 in FIG. 4. This results in the generation of the cancellation signal 422, which is provided to the second monopole antenna 210. In some cases, the decoupling circuit 212 causes the cancellation signal 422 to have a relatively similar amplitude as the coupling RF signal 418 and have a phase that is approximately 180 degrees out-of-phase relative to the coupling RF signal 418.

At 610, the portion of the first radio-frequency signal at the second monopole antenna is attenuated by providing the first cancellation signal to the second monopole antenna. For example, the coupling path 306 provides the cancellation signal 422 to the second decoupling node 408 and the cancellation signal 422 attenuates the coupling RF signal 418 at the second monopole antenna 210. By attenuating the coupling RF signal 418, the first monopole antenna 208 and the second monopole antenna 210 can behave independent of each other and realize different radiation patterns for MIMO applications.

Example Computing System

Figure 7:
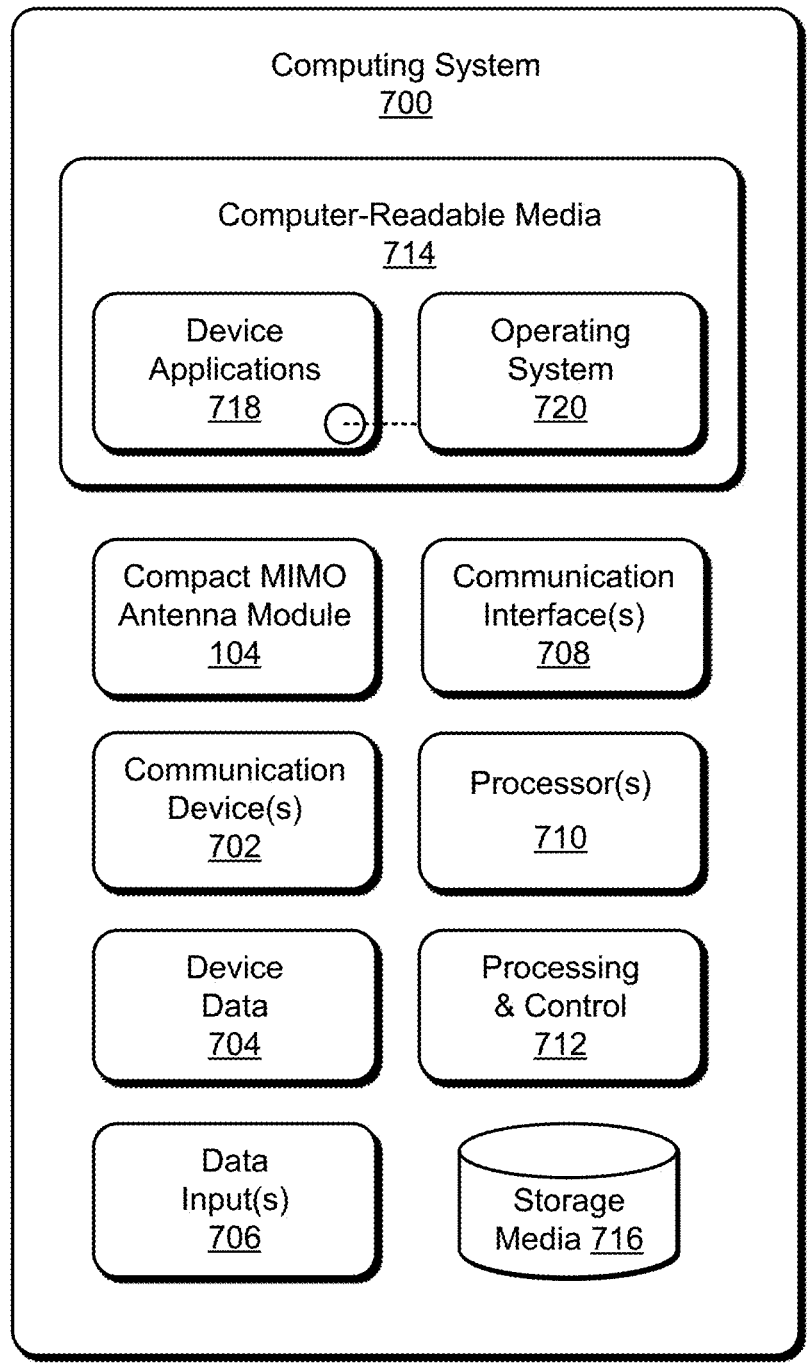
FIG. 7 illustrates an example computing system embodying, or in which techniques may be implemented that enable use of, a compact MIMO antenna module.

FIG. 7 illustrates various components of an example computing system 700 that can be implemented as any type of client, server, and/or computing device as described with reference to the previous FIG. 2 for wireless communication applications.

The computing system 700 includes the compact MIMO antenna module 104 and communication devices 702 that enable wireless communication of device data 704 (e.g., received data, data that is being received, data scheduled for broadcast, or data packets of the data). The device data 704 or other device content can include configuration settings of the device, media content stored on the device, and/or information associated with a user of the device. Media content stored on the computing system 700 can include any type of audio, video, and/or image data. In this case, the compact MIMO antenna module 104 transmits or receives signals that carry at least a portion of the device data 704. The computing system 700 includes one or more data inputs 706 via which any type of data, media content, and/or inputs can be received. Other types of data inputs 706 include human utterances, user-selectable inputs (explicit or implicit), messages, music, television media content, recorded video content, and any other type of audio, video, and/or image data received from any content and/or data source.

The computing system 700 also includes one or more communication interfaces 708, which can be implemented as any one or more of a serial and/or parallel interface, a wireless interface, any type of network interface, a modem, and as any other type of communication interface. The communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700. Alternatively or in addition, the computing system 700 can be implemented with any one or combination of hardware, firmware, or fixed logic circuitry that is implemented in connection with processing and control circuits which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes a computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, a hardware abstraction layer for a particular device, and so on. The device applications 718 also include any system components, engines, or managers to enable wireless communication.

CONCLUSION

Although techniques using, and apparatuses including a compact MIMO antenna module have been described in language specific to features and/or methods, it is to be understood that the subject of the appended claims is not necessarily limited to the specific features or methods described. Rather, the specific features and methods are disclosed as example implementations of a compact MIMO antenna module.

The invention claimed is:

1. An antenna module comprising:
   a first portion, a second portion, and a third portion, the second portion positioned between the first portion and the third portion;
   a first feed port;
   a second feed port;
   a first monopole antenna including a first feed node and a first decoupling node, the first feed node coupled to the first feed port, at least a portion of the first monopole antenna disposed within the first portion;
   a second monopole antenna including a second feed node and a second decoupling node, the second feed node coupled to the second feed port, at least a portion of the second monopole antenna disposed within the third portion; and
   a direct coupling path between the first decoupling node and the second decoupling node, the direct coupling path including:
      a decoupling circuit connected between the first decoupling node and the second decoupling node, the decoupling circuit disposed within the second portion, the decoupling circuit configured to substantially isolate the first monopole antenna and the second monopole antenna from each other.

2. The antenna module of claim 1, wherein:
   the antenna module includes a ground plane; and
   the second portion includes a volume between a first plane and a second plane that are approximately perpendicular to the ground plane and respectively pass through the first decoupling node and the second decoupling node.

3. The antenna module of claim 2, wherein the first monopole antenna and the second monopole antenna respectively comprise inverted-F antennas (IFAs).

4. The antenna module of claim 3, wherein the inverted-F antennas are approximately symmetrical about a third plane that is approximately perpendicular to the ground plane.

5. The antenna module of claim 1, wherein the decoupling circuit improves isolation between the first monopole antenna and the second monopole antenna by at least ten decibels in comparison to the isolation between the first monopole antenna and the second monopole antenna without the decoupling circuit.

6. The antenna module of claim 1, wherein the decoupling circuit includes at least one of the following:
   a distributed element; or
   a lumped element.

7. The antenna module of claim 1, wherein the decoupling circuit includes at least one of the following:
   an inductor; or
   a capacitor.

8. The antenna module of claim 1, wherein the antenna module comprises a multiple-input multiple-output (MIMO) antenna module configured to:
   transmit and receive WiFi™ signals via the first monopole antenna and the second monopole antenna; and
   transmit and receive Bluetooth™ signals via the first monopole antenna and the second monopole antenna.

9. A method comprising:
   exciting a first monopole antenna of an antenna module with a first radio frequency signal, the exciting of the first monopole antenna causing the first monopole antenna and a second monopole antenna of the antenna module to indirectly couple together via a first coupling path;
   propagating, via the first coupling path, a portion of the first radio-frequency signal from the first monopole antenna to the second monopole antenna;
   providing, via a decoupling circuit of the antenna module, a second coupling path that directly connects the first monopole antenna and the second monopole together; the first monopole antenna, the decoupling circuit, and the second monopole antenna arranged such that the decoupling circuit is disposed within a portion of the antenna module that is between the first monopole antenna and the second monopole antenna;
   adjusting, via the decoupling circuit, characteristics of another portion of the first radio-frequency signal that propagates through the second coupling path to generate a first cancellation signal; and
   attenuating the portion of the first radio-frequency signal at the second monopole antenna by providing the first cancellation signal to the second monopole antenna.

10. The method of claim 9, further comprising:
   exciting the second monopole antenna of the antenna module with a second radio-frequency signal;
   propagating, via the first coupling path, a portion of the second radio-frequency signal from the second monopole antenna to the first monopole antenna;
   adjusting, via the decoupling circuit, characteristics of another portion of the second radio-frequency signal that propagates through the second coupling path to generate a second cancellation signal; and
   attenuating the portion of the second radio-frequency signal at the first monopole antenna by providing the second cancellation signal to the first monopole antenna.

11. The method of claim 10, wherein the attenuating of the portion of the first radio-frequency signal at the second monopole antenna and the attenuating of the portion of the second radio-frequency signal at the second monopole antenna jointly comprise increasing an amount of isolation between the first monopole antenna and the second monopole antenna by at least ten decibels in comparison to the amount of isolation between the first monopole antenna and the second monopole antenna without the decoupling circuit.

12. The method of claim 9, wherein:
   the antenna module includes a ground plane;
   the decoupling circuit is coupled between a first decoupling node of the first monopole antenna and a second decoupling node of the second monopole antenna; and
   the portion of the antenna module includes a volume between a first plane and a second plane that are approximately perpendicular to the ground plane and respectively pass through the first decoupling node and the second decoupling node.

13. The method of claim 12, wherein:
   the first monopole antenna is coupled to the ground plane;
   the second monopole antenna is coupled to the ground plane; and
   the first coupling path passes through at least a portion of the ground plane.

14. The method of claim 13, wherein:
   the exciting of the first monopole antenna comprises generating an electric field that overlaps at least a portion of the second monopole antenna; and
   the first coupling path includes a third coupling path that passes through an air medium based on the electric field.

15. The method of claim 9, wherein the adjusting comprises at least one of the following:
   adjusting an amplitude of the other portion of the first radio-frequency signal; or
   adjusting a phase of the other portion of the first radio-frequency signal.

16. The method of claim 15, wherein the adjusting of the amplitude comprises at least one of the following:
   amplifying the other portion of the first radio-frequency signal; or
   attenuating the other portion of the first radio-frequency signal.

17. The method of claim 9, wherein the adjusting comprises dynamically modifying characteristics of the other portion of the first radio-frequency signal to adapt to changes in a propagation of the portion of the first radio-frequency signal through the first coupling path.

18. An apparatus comprising:
   an antenna module including:
      two monopole antennas having respective feed portions and respective open portions, the feed portions including respective feed nodes, the open portions including respective decoupling nodes, the two monopole antennas oriented such that the respective open portions are oriented towards each other and the respective feed portions are oriented away from each other; and
      a decoupling circuit directly connected between the respective decoupling nodes of the two monopole antennas and configured to:
         provide a direct coupling path between the respective decoupling nodes of the two monopole antennas; and
         substantially isolate the two monopole antennas from each other.

19. The apparatus of claim 18, further comprising:
   a wireless transceiver including:
      a switch having two poles coupled to the respective feed nodes of the two monopole antennas;
      a diplexer coupled to a throw of the switch;
      a front-end circuit coupled to the diplexer and configured to:
         generate or process two first radio-frequency signals associated with a first carrier frequency; and generate or process two second radio-frequency signals associated with a second carrier frequency,
wherein the two monopole antennas are configured to:
   transmit or receive the two first radio-frequency signals, respectively; and
   transmit or receive the two second radio-frequency signals, respectively.

20. The apparatus of claim 19, wherein the first carrier frequency and the second carrier frequency are associated with at least one of the following:
   a wireless local area network (WLAN) carrier frequency; or
   a cellular network carrier frequency.

\* \* \* \* \*